United States Patent
Kamath et al.

(10) Patent No.: US 12,283,894 B2
(45) Date of Patent: Apr. 22, 2025

(54) PUSH-PULL CONVERTER WITH SATURATION PREVENTION

(71) Applicant: Texas Instruments Incorporated, Dallas, TX (US)

(72) Inventors: Anant Kamath, Bangalore (IN); Suvadip Banerjee, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 117 days.

(21) Appl. No.: 18/153,249

(22) Filed: Jan. 11, 2023

(65) Prior Publication Data

US 2024/0235422 A1 Jul. 11, 2024

(51) Int. Cl.
*H02M 3/338* (2006.01)
*H02M 1/00* (2007.01)
*H02M 7/538* (2007.01)

(52) U.S. Cl.
CPC ....... *H02M 3/3382* (2013.01); *H02M 1/0009* (2021.05); *H02M 1/0064* (2021.05); *H02M 7/538* (2013.01)

(58) Field of Classification Search
CPC ............. H02M 3/3382; H02M 1/0009; H02M 1/0064; H02M 7/538
See application file for complete search history.

(56) References Cited

U.S. PATENT DOCUMENTS 6,169,668 B1 * 1/2001 Clayton .............. H02M 3/3378 363/133

\* cited by examiner

*Primary Examiner* — Jue Zhang
(74) *Attorney, Agent, or Firm* — John R. Pessetto; Frank D. Cimino

(57) ABSTRACT

In described examples, a converter circuit includes a primary-side ground, a current sensor, a control signal generator, first and second control switches, and a transformer with a center-tapped primary-side coil. A first terminal of the first control switch is coupled to a first terminal of the coil and a first input of the current sensor. A first terminal of the second control switch is coupled to a second terminal of the coil and a second input of the current sensor. Second terminals of the first and second control switches are coupled to ground. The control signal generator closes the first control switch and opens the second control switch in a first phase; opens the first control switch and closes the second control switch in a second phase that alternates with the first phase; and adjusts first phase duration in response to current sensor output, without changing converter period duration.

15 Claims, 12 Drawing Sheets

PUSH-PULL CONVERTER WITH SATURATION PREVENTION

TECHNICAL FIELD

This application relates generally to transformers, and more particularly to push-pull converters with saturation prevention.

BACKGROUND

A transformer uses a varying current in one or more primary-side coils wound around a core of the transformer to produce a magnetic flux in the core. This magnetic flux induces a varying electromotive force across one or more secondary-side coils wound around the core, enabling electrical energy to be transferred from primary-side coils to separate secondary-side coils without a conductive connection between the primary-side and secondary-side coils. In some examples, transformers are used to change alternating-current (AC) voltage levels, provide galvanic isolation between circuits, and couple stages of signal-processing circuits.

In some examples, a push-pull converter uses primary-side coils symmetrically disposed around an electrical power source, alternatingly coupled to ground by switches symmetrically disposed between the respective primary-side coils and ground. This enables current to be drawn from the power source and transferred to the secondary side during both halves (phases) of the switching cycle. In some examples, push-pull converters are used in various automotive systems, including hybrid electric and full electric vehicle systems. For example, push-pull converters can be used to provide the bias voltage for isolated insulated gate bipolar transistor (IGBT) gate drivers in traction inverters. Traction inverters convert direct current (DC) from the vehicle's battery to AC current to be used to drive the motors in the drivetrain. In another example, push-pull converters are used in electric vehicle on-board chargers (OBCs).

SUMMARY

In described examples, a push-pull converter includes a primary-side ground, a current sensor, a control signal generator, first and second control switches, and a transformer with a center-tapped primary-side coil. A first terminal of the first control switch is coupled to a first terminal of the coil and a first input of the current sensor. A first terminal of the second control switch is coupled to a second terminal of the coil and a second input of the current sensor. Second terminals of the first and second control switches are coupled to ground. The control signal generator closes the first control switch and opens the second control switch in a first phase; opens the first control switch and closes the second control switch in a second phase that alternates with the first phase; and adjusts first phase duration in response to current sensor output, without changing push-pull converter period duration.

DETAILED DESCRIPTION

Ideally, a push-pull converter exhibits symmetric behavior, so that the maximum amounts of energy stored by the magnetic core in first and second phases of operation are equal. This corresponds to the two phases of operation of the push-pull converter generating magnetic fields in the core that have equal maximum magnitudes and opposite polarities. However, device mismatch, such as in the primary-side coils or in the primary-side control switches, can result in one phase of operation causing more magnetic flux than the other. This can lead to progressive accumulation of magnetic flux in the core (referred to as flux walking), potentially causing saturation of the core. Saturation is the point beyond which an increase in applied external magnetic field does not increase magnetization of the core. A transformer that operates while its core is saturated not only is inefficient, but can also suffer damage due to the energy buildup.

The transformer of a push-pull converter can also exhibit inefficient nonlinear behavior as the core approaches saturation. As further described below, an example push-pull converter reduces the possibility of saturation by controlling the durations of one or both of the operation phases of the converter. This control can be performed in response to voltages measured on the high sides of the primary-side control switches while the respective switches are closed.

Figure 1:
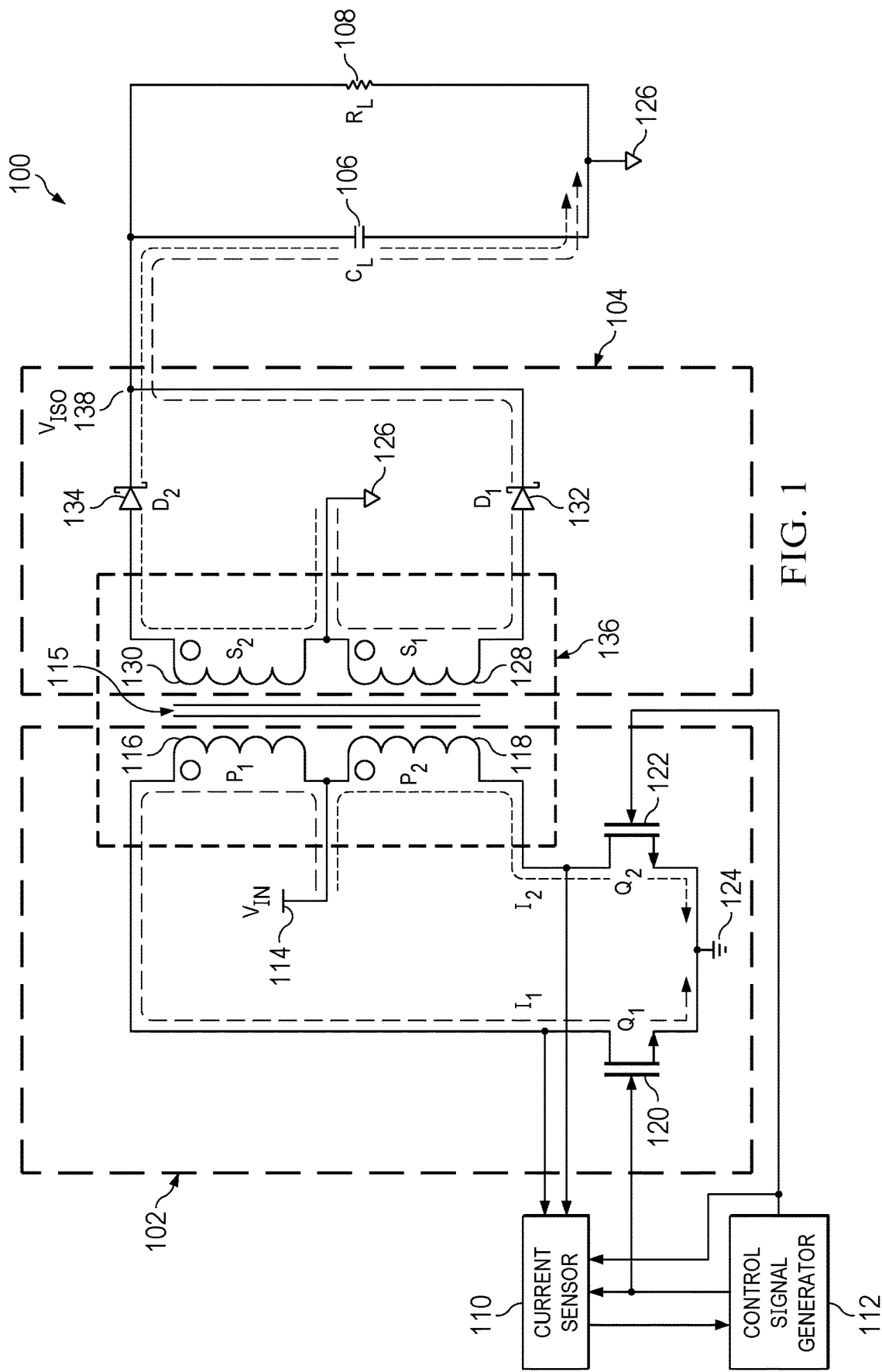
FIG. 1 is a circuit and functional block diagram of an example push-pull converter.

FIG. 1 is a circuit and functional block diagram of an example push-pull converter 100. The push-pull converter 100 includes a primary side 102, a secondary side 104, a load capacitor 106 (for example, a polarized capacitor) with capacitance $C_L$, a load 108 (represented as a resistor) with resistance $R_L$, a current sensor 110, and a control signal generator 112. The primary side 102 includes a voltage source ($V_{IN}$) 114, a magnetic core 115, a first primary-side coil ($P_1$) 116, a second primary-side coil ($P_2$) 118, a first control switch ($Q_1$) 120, a second control switch ($Q_2$) 122, and a primary-side ground 124 (or other low voltage reference). The first and second control switches 120 and 122 are each n-channel metal-oxide-semiconductor field-effect transistors (MOSFETS). The secondary side 104 includes a secondary-side ground 126 (or other low voltage reference) that is isolated from the primary-side ground 124, a first secondary-side coil ($S_1$) 128, a second secondary-side coil ($S_2$) 130, a first diode ($D_1$) 132, and a second diode ($D_2$) 134. In some examples, the first diode 132 and the second diode 134 are Schottky diodes. The first primary-side coil 116, the second primary-side coil 118, the first secondary-side coil 128, and the second secondary-side coil 130 are wound around the magnetic core 115, and these components together form a transformer 136.

The voltage source 114 is connected to a first terminal of the first primary-side coil 116 and a first terminal of the second primary-side coil 118. This coil configuration is sometimes referred to as center-tapped. A second terminal of the first primary-side coil 116 is connected to a drain of the first control switch 120 and to a first input of the current sensor 110. A second terminal of the second primary-side coil 118 is connected to a drain of the second control switch 122 and to a second input of the current sensor 110. The primary-side ground 124 is connected to a source of the first control switch 120 and a source of the second control switch 122. An output of the current sensor 110 is connected to an input of the control signal generator 112. The control signal generator 112 provides a first control signal to a gate of the first control switch 120 and a third input (a first control input) of the current sensor 110, and provides a second control signal to a gate of the second control switch 122 and a fourth input (a second control input) of the current sensor 110.

The secondary-side ground 126 is connected to a first terminal of the first secondary-side coil 128 and to a first terminal of the second secondary-side coil 130. A second terminal of the first secondary-side coil 128 is connected to an anode of the first diode 132. A second terminal of the second secondary-side coil 130 is connected to an anode of the second diode 134. A cathode of the first diode 132 is connected to a cathode of the second diode 134, a first plate of the load capacitor 106, and a first terminal of the load 108. The secondary-side ground 126 is connected to a second plate of the load capacitor 106 and a second terminal of the load 108. An output voltage $V_{ISO}$ (isolated voltage) of the push-pull converter 100, which is isolated from the input voltage $V_{IN}$ of the push-pull converter 100, is located at an output node 138. The output node 138 is connected to the cathodes of the first and second diodes 132 and 134, the first plate of the load capacitor 106, and the first terminal of the load 108. A node, herein, refers to a point of connection in a circuit between two or more circuit elements.

The push-pull converter 100 is operated in two phases, controlled by alternatingly closing one of the first control switch 120 and the second control switch 122, while the other is open. A first current $I_1$ 206 flows from the voltage source 114 to the primary-side ground 124 during a first phase 204 (see FIG. 2), and a second current $I_2$ 212 flows from the voltage source 114 to the primary-side ground 124 during a second phase 210. The currents $I_1$ 206 and $I_2$ 212 cause energy to be stored in the magnetic core 115 as a magnetic field, and cause energy to be transferred across an isolation barrier of the transformer 136, i.e., from a corresponding one of the primary-side coils 116 or 118 to the secondary-side coils 128 and 130. Further description of $I_1$ 206 and $I_2$ 212 is provided with respect to FIG. 2. Between the first and second phases 204 and 210 both the first control switch 120 and the second control switch 122 are opened for a time, referred to as dead time, to prevent shoot-through. Energy continues to be transferred across the isolation barrier from the primary side 102 to the secondary side 104 during dead times, discharging the magnetic field stored in the magnetic core 115. Further description of dead times is provided with respect to FIGS. 3A and 3B.

The first phase 204 begins when the first control switch 120 closes in response to a signal from the control signal generator 112, while the second control switch 122 remains open. During the first phase 204, current does not flow through a second primary-side current path (described below), and instead a first current $I_1$ 206 flows through a first primary-side current path: from the voltage source 114, through the first primary side coil 116, via the first control switch 120, to the primary-side ground 124. This current causes the first primary-side coil 116 to generate a magnetic flux that causes the magnetic core 115 to store magnetic energy with a first polarity, and that induces a current in the first secondary-side magnetic coil 128 and in the second secondary-side magnetic coil 130. The current through the first secondary-side magnetic coil 128 flows from the secondary-side ground 126, through the first diode 132, via the load capacitor 106, to the secondary-side ground 126. The current through the second secondary-side magnetic coil 130 does not flow, because the direction of the induced current causes the second diode 134 to be reverse-biased. The first phase 204 ends, and the current sensor 110 measures $I_1$ 206 by sampling a voltage at the drain of the first control switch 120, when the first control switch 120 opens in response to a signal from the control signal generator 112.

The second phase 210 begins when the second control switch 122 closes in response to a signal from the control signal generator 112, while the first control switch 120 remains open. During the second phase 210, current does not flow through the first primary-side current path, and instead a second current $I_2$ 212 flows through the second primary-side current path: from the voltage source 114, through the second primary side coil 118, via the second control switch 122, to the primary-side ground 124. This current causes the second primary-side coil 118 to generate a magnetic flux that causes the magnetic core 115 to store magnetic energy with a second polarity opposite to the first polarity, and that induces a current in the first secondary-side magnetic coil 128 and in the second secondary-side magnetic coil 130. The current through the first secondary-side magnetic coil 128 does not flow, because the direction of the induced current causes the first diode 132 to be reverse-biased. The current through the second secondary-side magnetic coil 130 flows from the secondary-side ground 126, through the second diode 134, via the load capacitor 106, to the secondary-side ground 126. The second phase 210 ends, and the current sensor 110 measures $I_2$ 212 by sampling a voltage at the drain of the second control switch 122, when the second control switch 122 opens in response to a signal from the control signal generator 112.

If the total magnetic flux generated by the first primary-side coil 116 during the first phase 204 does not equal the total magnetic flux generated by the second primary-side coil 118 during the second phase 210, the magnetic core 115 may store an increasing amount of magnetic energy (of the first polarity or the second polarity, depending on which primary-side coil 116 or 118 generates more total magnetic flux) in successive periods of the push-pull converter 100. This can cause inefficient operation as a peak $I_1$ 206 or $I_2$ 212 increases in successive periods of the push-pull converter 100, and may also cause saturation of the magnetic core 115. Imbalance in magnetic flux generated by the two phases 204 and 210 can be caused by, for example, a winding mismatch between the first and second primary-side coils 116 and 118, or by a mismatch in turn-on timings between the first and second control switches 120 and 122. Ideal operation of the push-pull converter 100 is further discussed with respect to FIG. 4A. Operation of the push-pull converter 100 leading to saturation of the magnetic core 115 is further discussed with respect to FIGS. 4B and 4C.

If the first current $I_1$ 206 measured by the current sensor 110 at the end of the first phase 204 is greater than the second current $I_2$ 212 measured by the current sensor 110 at the end of the second phase 210, then the control signal generator 112 shortens the first phase 204 without changing the duration of a period of the push-pull converter 100. This is done by reducing a duration during which the first control switch 120 is closed (turned on), and correspondingly adjusting adjacent dead times, within a period of the push-pull converter 100. If the first current $I_1$ 206 measured by the current sensor 110 at the end of the first phase 204 is less than the second current $I_2$ 212 measured by the current sensor 110 at the end of the second phase 210, then the control signal generator 112 lengthens the first phase 204 by increasing a duration during which the first control switch 120 is closed in a period of the push-pull converter 100, again without changing the duration of a period of the push-pull converter 100. In some examples, durations of both the first phase 204 and the second phase 210 are adjusted in response to the measured currents $I_1$ 206 and $I_2$ 212; such as by lengthening the duration of one phase and shortening the duration of the other phase. Adjusting phase duration enables the push-pull converter 100 to balance magnetic flux generated during the respective phases, avoiding saturation. Examples of the current sensor 110 and control signal generator 112 are further discussed with respect to FIGS. 5 and 6. Operation of the push-pull converter 100 is further discussed with respect to FIGS. 7 and 8.

Figure 2:
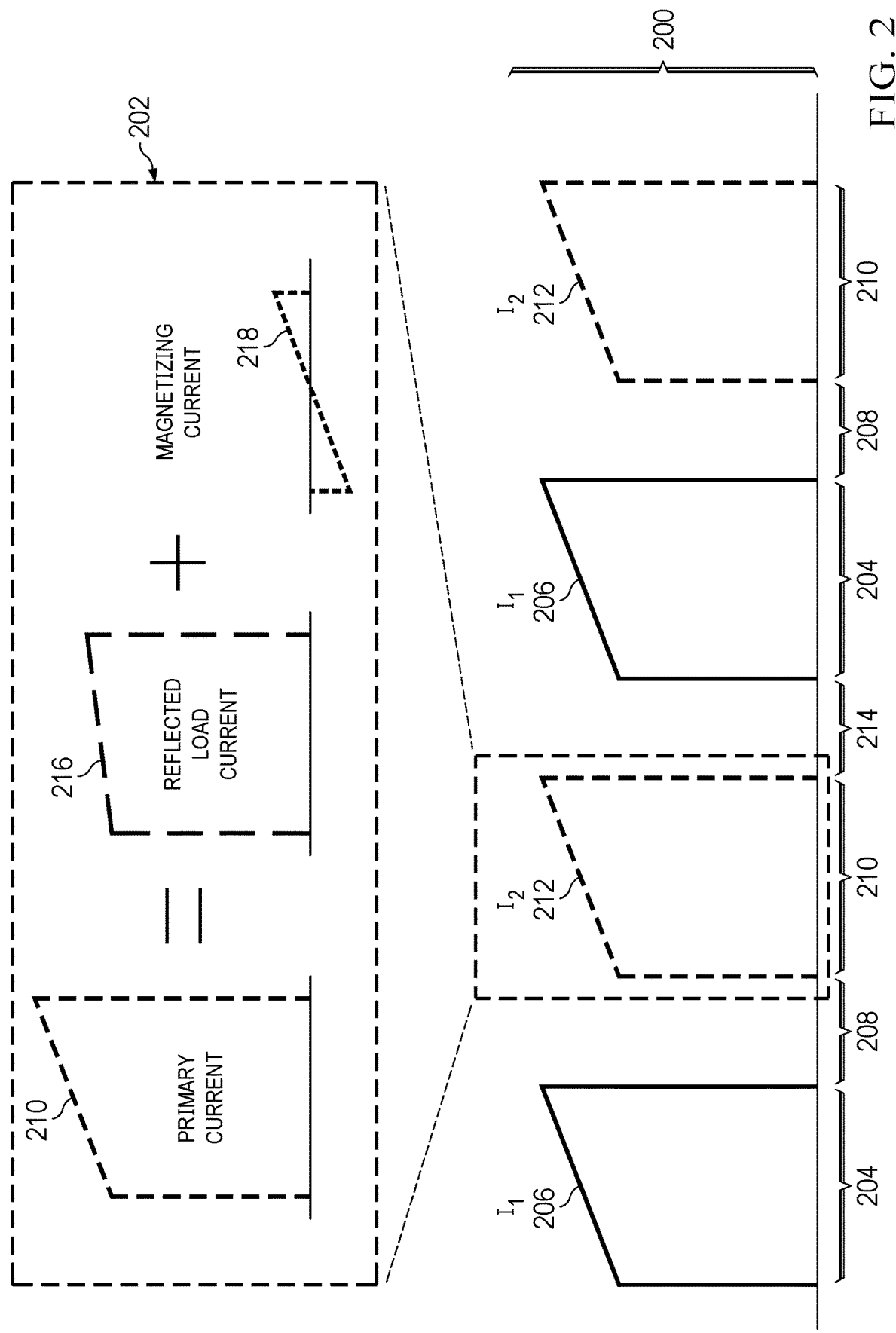
FIG. 2 is a graph showing current through the first and second control switches, with a captioned excerpt of the graph describing components of the current $I_2$ through the second control switch.

FIG. 2 is a graph 200 showing current through the first and second control switches 120 and 122, with a captioned excerpt 202 of the graph 200 describing components of the current $I_2$ 212 through the second control switch 122. For both the graph 200 and the captioned excerpt 202, the horizontal axis represents time and the vertical axis represents current. During the first phase 204 the current $I_1$ 206 flows through the first control switch 120. After the first phase 204 is a first dead time 208, during which both the first control switch 120 and the second control switch 122 are open, and zero current flows through the first and second control switches 120 and 122. Following the first dead time 208, during the second phase 210, the current $I_2$ 212 flows through the second control switch 122. After the second phase 210 is a second dead time 214, during which both the first control switch 120 and the second control switch 122 are open, and zero current flows through the first and second control switches 120 and 122.

As shown in the captioned excerpt 202, the primary-side current $I_2$ 212 includes a reflected load current 216 component and a magnetizing current 218 component. The magnetizing current 218 establishes the magnetic flux in the corresponding primary-side coil (in this case, the second primary-side coil 118) that causes the core 115 to store magnetic energy. The voltage and impedance across one coil (winding), such as the second primary-side coil 118, are reflected across the other three coils, such as the first primary-side coil 116 and the first and second secondary-side coils 128 and 130. Accordingly, the reflected load current 216 is current through the load 108 that is transformed, or reflected, through the primary-side coils 116 and 118. The reflected load current 216 cancels the magnetomotive force generated as a result of current through the first and second secondary-side coils 128 and 130, maintaining the magnetic flux established by the magnetizing current 218. Similar current components make up $I_1$ 206 as make up $I_2$ 212. Ideally, the magnetizing currents in both the first and second phases 204 and 210 each include a negative period and a positive period. Namely, a period of negative magnetizing current causes induced current flow in a first direction corresponding to the previous phase (the first phase 204 or the second phase 210) to decrease and then cease, and a period of positive magnetizing current causes induced current flow in a second direction corresponding to the current phase (the other one of the first phase 204 or the second phase 210 to increase).

An imbalance between the total (integrated) amounts of magnetic flux generated during the first phase 204 and the second phase 210 can cause the corresponding magnetizing currents 218 to become more positive or more negative. Such an imbalance causes magnetizing currents generated in the first and second phases 204 and 210 to both be more positive than negative or more negative than positive, depending on the sign of the imbalance. This causes the peak current in the push-pull converter 100 to increase. Loss (inefficiency) in a push-pull converter 100 is proportional to the square of the peak current. In some examples, an imbalance in magnetic flux generated during the first and second phases 204 and 210 causes an exponential increase in peak current, which can result in overheating and damage.

Figure 3A:
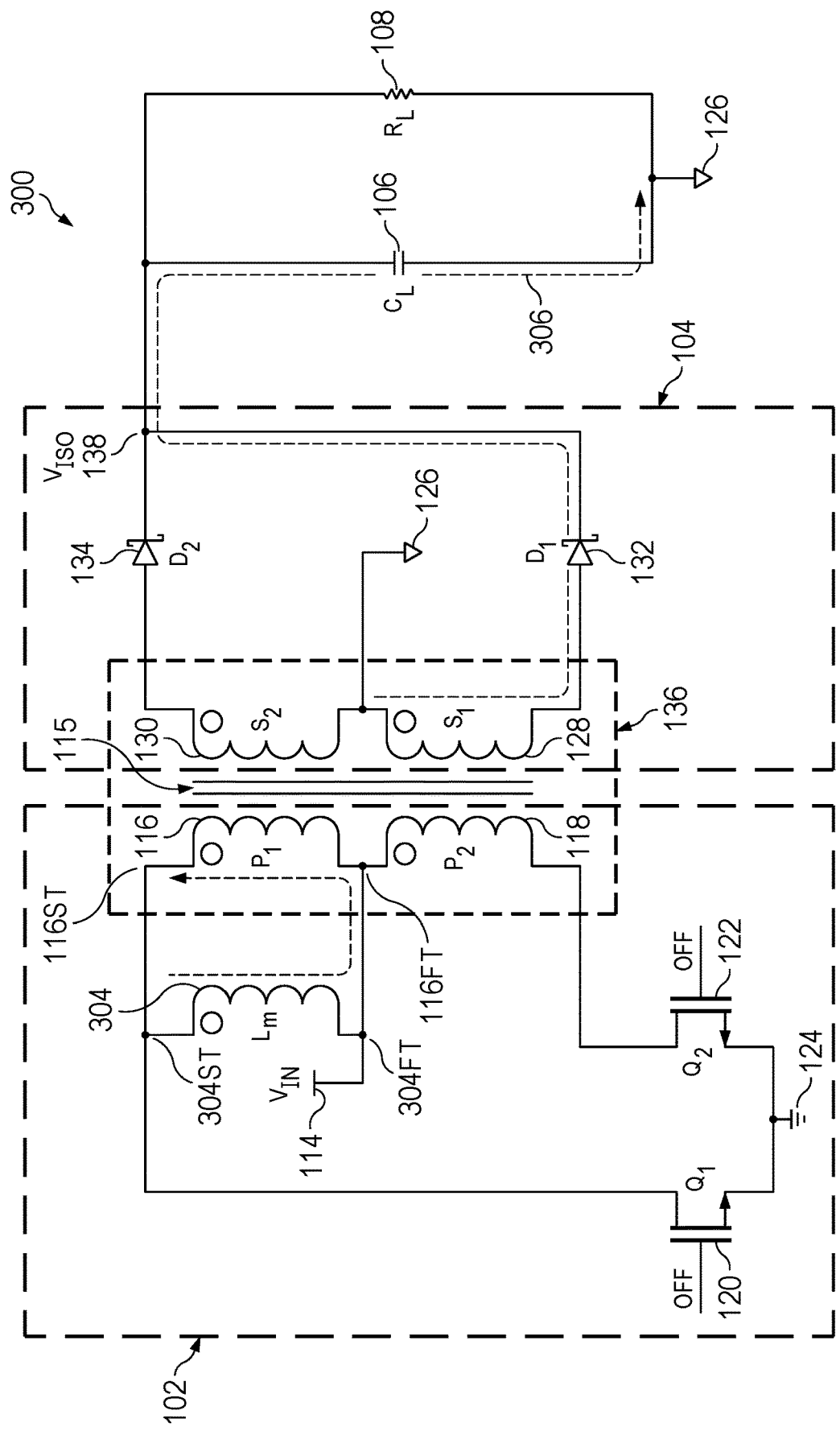
FIG. 3A is a circuit diagram of an example first model of current through the push-pull converter during a first dead time, following the first control switch opening at the end of a first phase.
Figure 3B:
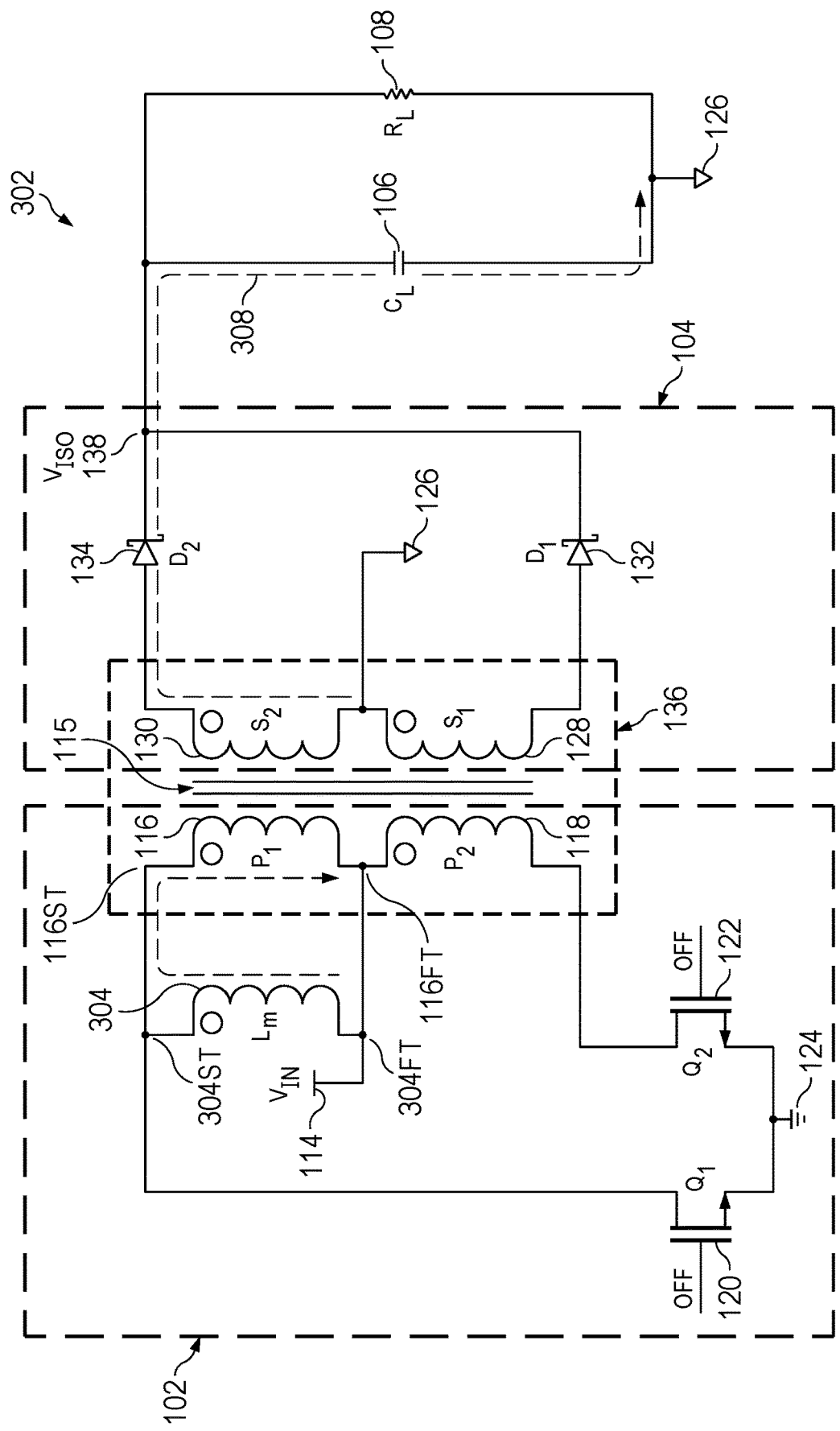
FIG. 3B is a circuit diagram of an example second model of current through the push-pull converter during a second dead time, following the second control switch opening at the end of a second phase.

FIG. 3A is a circuit diagram of an example first model 300 of current through the push-pull converter 100 during the first dead time 208, following the first control switch 120 opening at the end of the first phase 204. FIG. 3B is a circuit diagram of an example second model 302 of current through the push-pull converter 100 during the second dead time 214, following the second control switch 122 opening at the end of the second phase 210. A transformer can be modeled as having a magnetizing inductance 304, with inductance Lm. The magnetizing inductance 304 can be modeled as being connected in parallel with any of the transformer's coils because (as described above) the impedances across each of the coils is reflected across each of the other coils. In the examples shown in the first and second models 300 and 302, a first terminal 304FT of the magnetizing inductance 304 is connected to the voltage source 114 and the first terminal 116FT of the first primary-side coil 116. A second terminal 304ST of the magnetizing inductance 304 is connected to the drain of the first control switch 120 and the second terminal 116ST of the first primary-side coil 116. The first control switch 120 and the second control switch 122 are off during the first and second dead times 208 and 214. For clarity, the current sensor 110 and the control signal generator 112 are not shown.

The magnetizing inductance 304 is charged by the magnetizing current 218 in the first phase 204, and again in the second phase 210. During the first and second dead times 208 and 214, the magnetizing inductance 304 discharges via one of two secondary-side discharge paths depending on the polarity of the current flowing through the magnetizing inductance 304 at the start of the respective dead time 208 or 214. During the first dead time 208, as shown in the first model 300, the magnetizing inductance 304 discharges via a first discharge path 306. The first discharge path 306 corresponds to the first primary-side coil 116 coupled to the first secondary-side coil 128, causing current to flow through the first diode 132 to the load 108 (the second diode 134 is reverse biased during the first dead time 208). During the second dead time 214, as shown in the second model 302, the magnetizing inductance 304 discharges via a second discharge path 308. The second discharge path 308 corresponds to the first primary-side coil 116 coupled to the second secondary-side coil 130, causing current to flow through the second diode 134 to the load 108 (the first diode 132 is reverse biased during the second dead time 214).

These discharge currents result in $V_{ISO}$ being reflected back across the magnetizing inductance 304 through the turns ratio between the primary-side coils 116 and 118 and the secondary-side coils 128 and 130. Namely, $V_{ISO}$ is related to $V_{IN}$ (the voltage provided by the voltage source 114) by the turns ratio. This means that, effectively, negative $V_{IN}$ appears across the magnetizing inductance 304 during dead times, discharging the magnetizing inductance 304.

Figure 4A:
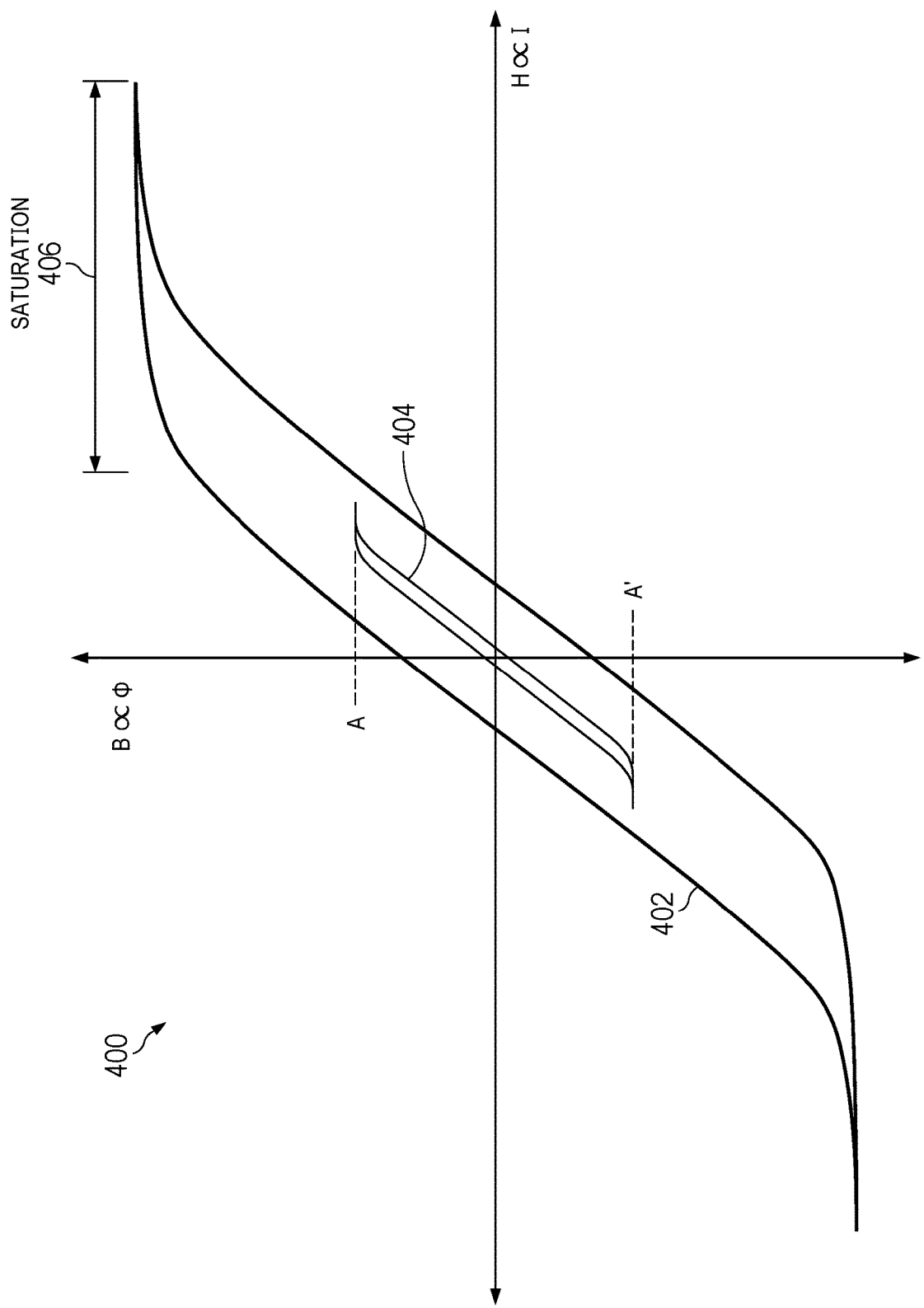
FIG. 4A is a graph of magnetic flux density (B) against magnetizing force (H) (a B-H graph) for an example of ideal operation of the push-pull converter of FIG. 1.

FIG. 4A is a graph 400 of magnetic flux density (B) against magnetizing force (H) (a B-H graph) for an example of ideal operation of the push-pull converter 100 of FIG. 1. The vertical axis represents magnetic flux density, and the horizontal axis represents magnetizing force. The magnetic flux density is proportional to the magnetic flux (Φ) through the first and second primary-side coils 116 and 118 (during the first and second phases 204 and 210) and the magnetizing inductance 304 (during the dead times 208 and 214). The magnetizing force is proportional to the current through the primary-side coils 116 and 118 and the magnetizing inductance 304. A hysteresis loop 402 represents a maximum B-H response of the magnetic core 115. A B-H curve 404 (also a loop) shows the relationship between magnetic flux density and magnetizing force for ideal operation of the push-pull converter 100. Saturation 406 occurs at a region of maximum flux density. Within the saturation 406 region, relatively large increases in magnetic force and current are correlated with relatively small (or zero) increases in magnetic flux density and magnetic flux.

At the end of the second phase 210, the magnetic flux density reaches A', so that at the beginning of the second dead time 214 (preceding the first phase 204) the magnetic flux density equals A' (A prime). During the second dead time 214 energy stored in the magnetic field of the magnetic core 115 is discharged, as described with respect to FIG. 3A, as current that causes a reduction in the magnitude of the magnetic flux density. This causes the magnetic flux density to move in a positive direction (towards A). During the first phase 204, the magnetizing current 218 component of $I_1$ 206 (see FIG. 2) causes the magnetic flux density in the magnetic core 115 to continue to move in a positive direction until the magnetic flux density reaches A. A equals negative A' as a result of ideal operation of the push-pull converter 100. Both A and A' are inside a range of operation of the push-pull converter 100 that does not reach saturation 406 of the magnetic core 115.

Ideal operation also means that the portion of the B-H curve 404 corresponding to the first dead time 208 and the second phase 210 is symmetric with (reflected around both the horizontal and vertical axes with respect to) the portion of the B-H curve 404 corresponding to the second dead time 214 and the first phase 204. At the beginning of the first dead time 208, the magnetic flux density equals A. During the first dead time 208, energy stored in the magnetic field of the magnetic core 115 is discharged, as described with respect to FIG. 3B, as current that causes a reduction in the magnitude of the magnetic flux density. This causes the magnetic flux density to move in a negative direction. During the second phase 210, the magnetizing current 218 component of $I_2$ 212 (see FIG. 2) causes the magnetic flux density in the magnetic core 115 to continue to move in a negative direction, until the magnetic flux density reaches A'.

Figure 4B:
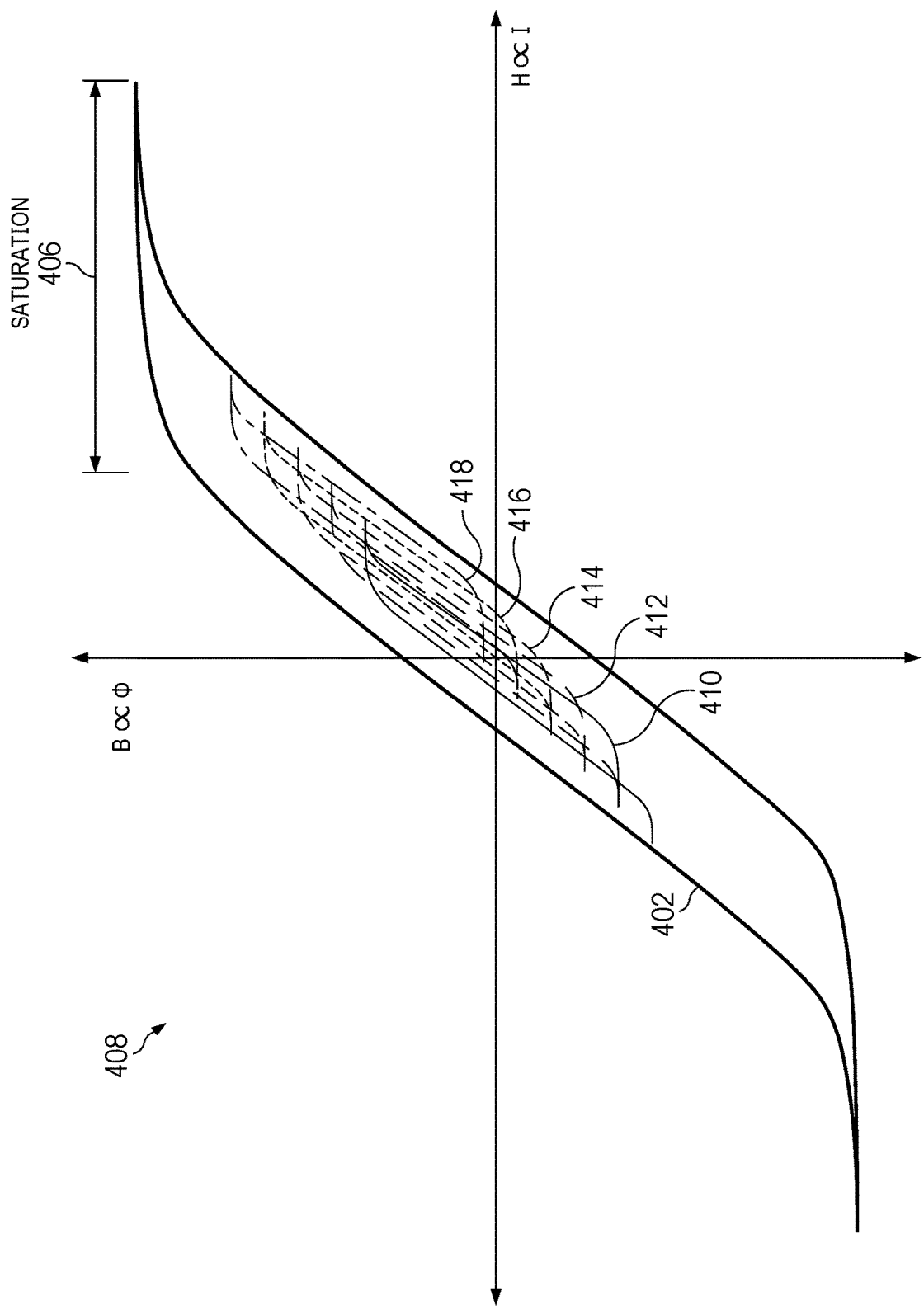
FIG. 4B is a B-H graph showing imbalanced operation of the push-pull converter of FIG. 1.

FIG. 4B is a B-H graph 408 showing imbalanced operation of the push-pull converter 100 of FIG. 1. The vertical axis represents magnetic flux density, and the horizontal axis represents magnetizing force. The hysteresis loop 402, representing the maximum B-H response of the magnetic core 115, is also shown herein. If the first phase 204 and the second phase 210 do not generate (with opposite polarities) the same total current—equivalently, the same total magnetomotive force—then the maximum magnitude of the magnetic flux density will increase after each cycle of operation of the push-pull converter 100. A first B-H curve 410 is produced by a first cycle. A second B-H curve 412 is produced by a second cycle. A third B-H curve 414 is produced by a third cycle. A fourth B-H curve 416 is produced by a fourth cycle, and a fifth B-H curve 418 is produced by a fifth cycle. Note that the lower end of the loop at the end of each cycle corresponds to a more positive magnetic flux density than the lower end of the loop at the beginning of each cycle. Accordingly, the B-H curves do not return to their starting points, so that each successive B-H curve starts at a higher magnetic flux density. This cycle-to-cycle trend towards saturation illustrates why this result is referred to as "flux walking." A push-pull converter 100 operated so that magnetic flux density is not balanced between the first and second phases 204 and 210 may need a larger transformer to transfer a same amount of energy from the primary side 102 to the secondary side 104.

Figure 4C:
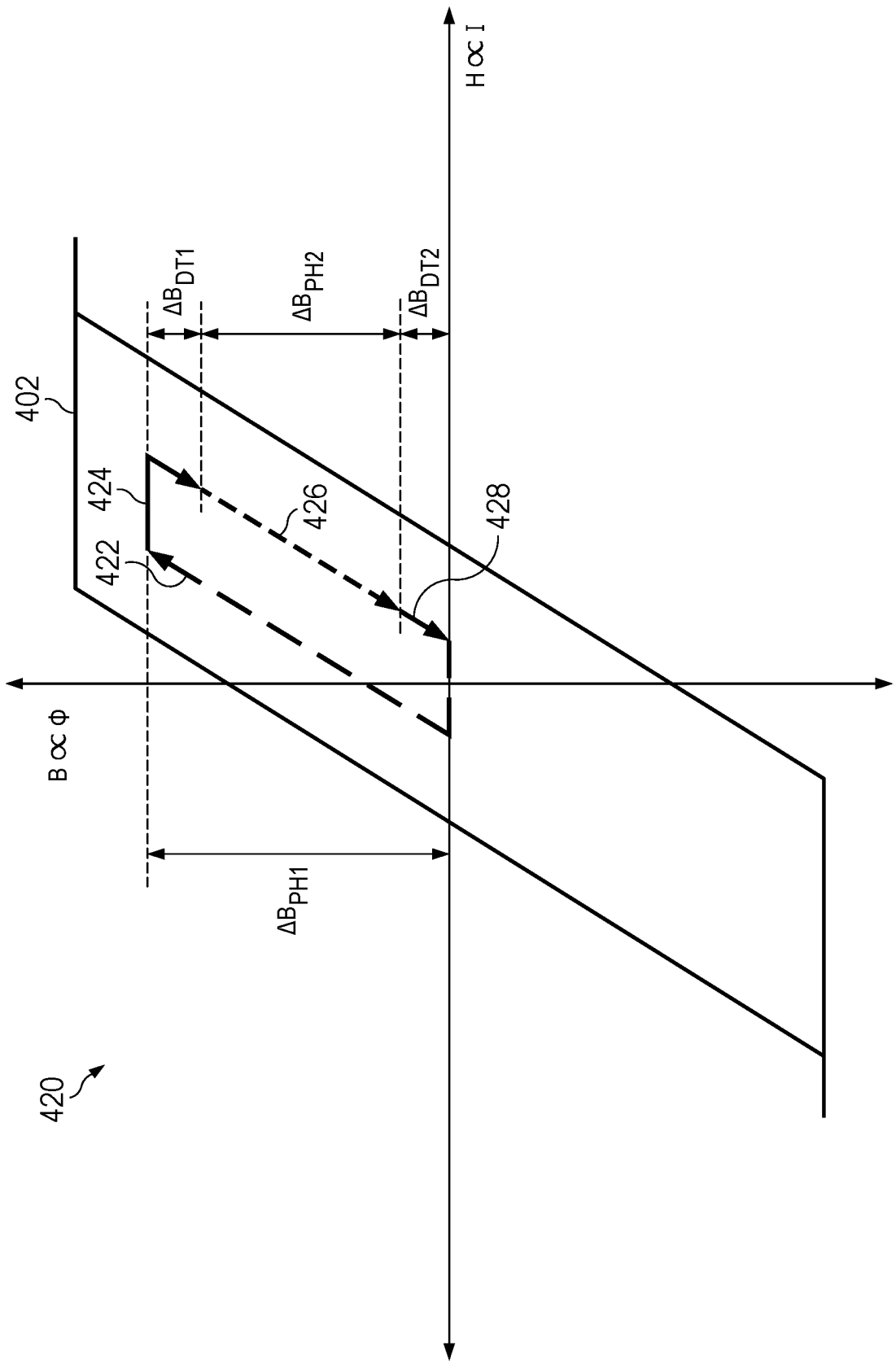
FIG. 4C is a B-H graph showing imbalanced operation of the push-pull converter of FIG. 1.

FIG. 4C is a B-H graph 420 showing imbalanced operation of the push-pull converter 100 of FIG. 1. For clarity, B-H curves in FIG. 4C, including the hysteresis loop 402, are shown using straight lines. The vertical axis represents magnetic flux density, and the horizontal axis represents magnetizing force. A B-H curve describing imbalanced operation of the push-pull converter 100 of FIG. 1 is divided into a first phase portion 422 describing operation during the first phase 204, a first dead time portion 424 describing operation during the first dead time 208, a second phase portion 426 describing operation during the second phase 210, and a second dead time portion 428 describing operation during the second dead time 214.

The change in magnetic flux density $\Delta B_{PH1}$ during the first phase 204 is related to a voltage $V_{P1}$ across the first primary-side coil 116 and a duration $T_{PH1}$ of the first phase 204, as $\Delta B_{PH1} \propto V_{P1} \times T_{PH1}$. The change in magnetic flux density $\Delta B_{DT1}$ during the first dead time 208 is related to a voltage $V_{LM1}$ across the magnetizing inductance 304 and a duration $T_{DT1}$ of the first dead time 208, as $\Delta B_{DT1} \propto V_{LM1} \times T_{DT1}$. The change in magnetic flux density $\Delta B_{PH2}$ during the second phase 210 is related to a voltage $V_{P2}$ across the second primary-side coil 118 and a duration $T_{PH2}$ of the second phase 210, as $\Delta B_{PH2} \propto V_{P2} \times T_{PH2}$. The change in magnetic flux density $\Delta B_{DT2}$ during the second dead time 214 is related to a voltage $V_{LM2}$ across the magnetizing inductance 304 and a duration $T_{DT2}$ of the second dead time 214, as $\Delta B_{DT2} \propto V_{LM2} \times T_{DT2}$. Current flow during a dead time 208 or 214 stops (falls to zero) if the magnetizing current or the magnetic field density falls to zero.

If the total change in magnetic field density towards zero during the dead times 208 and 214 is greater than the mismatch in changes in magnetic field density during the first phase 204 and the second phase 210, then the B-H curve 410 reaches a steady state in which peak current in one phase 204 or 210 is higher than peak current in the other phase 204 or 210. This steady state corresponds to inefficient operation. If there is a magnetic flux mismatch, and the condition for reaching the steady state is not satisfied, then the magnetizing current continues to increase in magnitude from cycle to cycle, until the magnetic core 115 reaches saturation. The condition for reaching the steady state can also be described as being satisfied if the average magnetic flux mismatch between the first and second phases 204 and 210 is not zero, and Equation 1 is true:

$$|\Delta B_{DT1} + \Delta B_{DT2}| > |\Delta B_{PH1} - \Delta B_{PH2}| \qquad \text{Equation 1}$$

Figure 5:
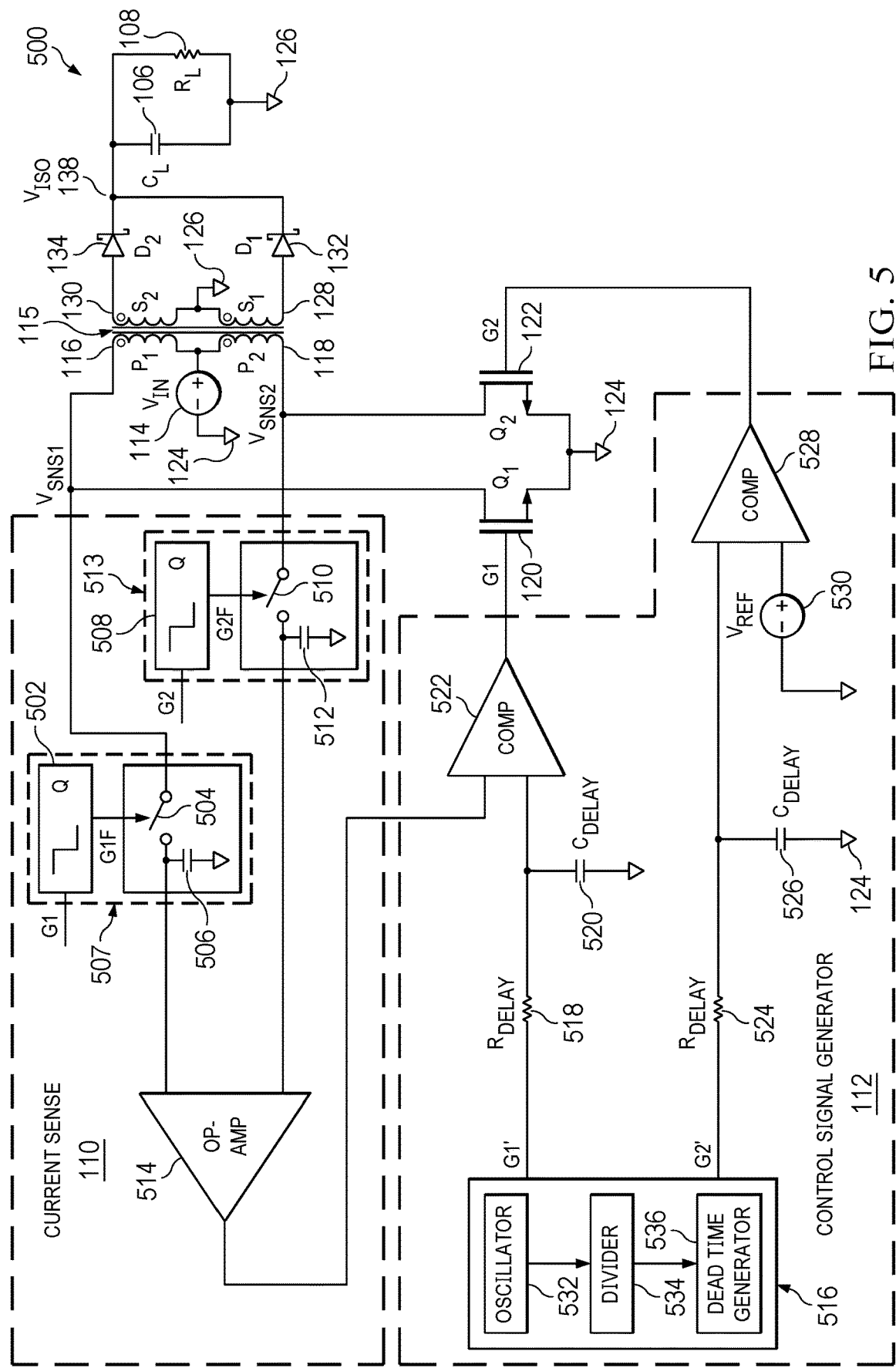
FIG. 5 is a circuit and functional block diagram of a push-pull converter of FIG. 1 with a first example implementation of a current sensor and a control signal generator.

FIG. 5 is a circuit and functional block diagram of a push-pull converter 100 of FIG. 1 with a first example implementation of the current sensor 110 and control signal generator 112. The current sensor 110 includes a first monostable multivibrator 502 (also called a monostable flip-flop), a first sense/hold (S/H) switch 504, a first S/H capacitor 506, a second monostable multivibrator 508, a second S/H switch 510, a second S/H capacitor 512, and an operational amplifier (op-amp) 514. The control signal generator 112 includes a square wave generator 516, a first delay resistor 518 with resistance $R_{DELAY}$, a first delay capacitor 520 with capacitance $C_{DELAY}$, a first comparator 522, a second delay resistor 524 with resistance $R_{DELAY}$, a second delay capacitor 526 with capacitance $C_{DELAY}$, a second comparator 528, and a voltage reference 530 that provides a reference voltage $V_{REF}$. The square wave generator 516 includes an oscillator 532, a divider 534, and a dead time generator 536.

A first terminal of the first S/H switch 504 is connected to the second terminal of the first primary-side coil 116 and the drain of the first control switch 120. A second terminal of the first S/H switch 504 is connected to a first plate of the first S/H capacitor 506 and a first input of the op-amp 514. The second plate of the first S/H capacitor 506 is connected to the primary-side ground 124. A first terminal of the second S/H switch 510 is connected to the second terminal of the second primary-side coil 118 and the drain of the second control switch 122. A second terminal of the second S/H switch 506 is connected to a first plate of the second S/H capacitor 512 and a second input of the op-amp 514. The second plate of the second S/H capacitor 512 is connected to the primary-side ground 124. An output of the op-amp 514 is connected to a first input of the first comparator 522.

A first output of the square wave generator 516 is connected to a first terminal of the first delay resistor 518. A second terminal of the first delay resistor 518 is connected to a first plate of the first delay capacitor 520 and to a second input of the first comparator 522. A second plate of the first delay capacitor 520 is connected to the primary-side ground 124. Together, the first delay resistor 518 and the first delay capacitor 520 form a first RC circuit.

A second output of the square wave generator 516 is connected to a first terminal of the second delay resistor 524. A second terminal of the second delay resistor 524 is connected to a first plate of the second delay capacitor 526 and to a first input of the second comparator 528. A second plate of the second delay capacitor 526 is connected to the primary-side ground 124. Together, the second delay resistor 524 and the second delay capacitor 526 form a second RC circuit. A negative terminal of the voltage reference 530 is connected to the primary-side ground 124, and a positive terminal of the voltage reference 530 is connected to a second input of the second comparator 528.

An output of the first comparator 522 is connected to a gate of the first control switch 120, and to a falling edge input of the first monostable multivibrator 502. Accordingly, the first monostable multivibrator 502 generates, at its respective output, a single output pulse of a specified duration when triggered by a falling edge of a signal received from the output of the first comparator 522. The output of the first monostable multivibrator 502 is connected to a control terminal (e.g., a gate) of the first S/H switch 504. Accordingly, the single output pulse controls the first S/H switch 504 to close in response to the specified duration of the single output pulse, and then to open. Together, the first monostable multivibrator 502, the first S/H switch 504, and the first S/H capacitor 506 form a first sampling circuit 507.

The first sampling circuit 507 senses and holds a first sensed voltage $V_{SNS1}$ at the drain of the first control switch 120. $V_{SNS1}$ equals $I_1$ 206 multiplied by the drain-source on-resistance ($R_{DSON1}$) of the first control switch 120 and the primary-side ground 124. The first S/H capacitor 506 holds the voltage $V_{SNS1}$ after the first S/H switch 504 opens in response to the end of the output pulse of the first monostable multivibrator 502. Accordingly, each time the first monostable multivibrator 502 generates an output pulse, the first S/H capacitor 506 is updated with a voltage that indicates the current through the first primary-side coil 116 at the end of the first phase 204 of the push-pull converter 100.

An output of the second comparator 528 is connected to a gate of the second control switch 122, and to a falling edge input of the second monostable multivibrator 508. Accordingly, the second monostable multivibrator 508 generates, at its respective output, a single output pulse of a specified duration when triggered by a falling edge of a signal received from the second comparator 528. The output of the second monostable multivibrator 508 is connected to a control terminal (e.g., a gate) of the second S/H switch 510, so that the single output pulse controls the second S/H switch 510 to close in response to the specified duration of the single output pulse, and then to open. Together, the second monostable multivibrator 508, the second S/H switch 510, and the second S/H capacitor 512 form a second sampling circuit 513.

The second sampling circuit 513 senses and holds a second sensed voltage $V_{SNS2}$ at the drain of the second control switch 122. $V_{SNS2}$ equals $I_2$ 212 multiplied by the drain-source on-resistance ($R_{DSON2}$) of the second control switch 122. The second S/H capacitor 512 holds the voltage $V_{SNS2}$ after the second S/H switch 510 opens in response to the end of the output pulse of the second monostable multivibrator 508. Accordingly, each time the second monostable multivibrator 508 generates an output pulse, the second S/H capacitor 512 is updated with a voltage that indicates the current through the second primary-side coil 118 at the end of the second phase 210 of the push-pull converter 100. Accordingly, the op-amp 514 outputs a voltage responsive to a difference between the current through the first primary-side coil 116 at the end of the most recent first phase 204 (indicated by $V_{SNS1}$), and the current through the second primary-side coil 118 at the end of the most recent second phase 210 (indicated by $V_{SNS2}$). As described above, the output of the op-amp 514 is provided to the second input of the first comparator 522.

In the square wave generator 516, the oscillator 532 outputs a signal with a first frequency to the divider 534, which outputs the signal, with a second frequency, to the dead time generator 536. The dead time generator 536 uses the signal to generate a first signal G1' (G1 prime) for use in generating a control signal for the first control switch 120, and a second signal G2' for use in generating a control signal for the second control switch 122. For example, the dead time generator 536 can delay rising edges of the signal provided by the divider 534 to generate G1'; and the dead time generator 536 can invert the signal provided by the divider 534, then delay rising edges of the inverted signal, to generate G2'. The dead time generator 536 provides G1' to the first terminal of the first delay resistor 518 via the first output of the square wave generator 516, and provides G2' to the first terminal of the second delay resistor 524 via the second output of the square wave generator 516.

While the G1' signal is a relatively high voltage (e.g., a logical one), the resulting current through the first delay resistor 518 charges the first delay capacitor 520. While the G1' signal is a relatively low voltage (e.g., a logical zero), the first delay capacitor 520 discharges. Accordingly, the first delay resistor 518 and first delay capacitor 520 (first RC circuit) together change the square wave G1' signal into a triangular signal (see FIG. 8). The first comparator 522 compares the triangularized G1' signal to the output of the op-amp 514. The first comparator 522 outputs a signal G1 that is a relatively high voltage (e.g., a logical one) while a voltage of the triangularized G1' signal is greater than the voltage of the output of the op-amp 514, and a relatively low voltage (e.g., a logical zero) while a voltage of the triangularized G1' signal is less than the voltage of the output of the op-amp 514. The high voltage G1 causes the first control switch 120 to turn on, and the low voltage G1 causes the first control switch 120 to turn off. This means that the signal output by the op-amp 514 acts as a first threshold voltage, and the push-pull converter 100 operates in the first phase 204 while the voltage of the triangularized G1' signal exceeds the first threshold voltage.

Also, G1 transitioning from the high voltage to the low voltage causes the first multistable multivibrator 502 to produce the pulse with the specified duration in an output signal G1F (F for falling edge) of the first multistable multivibrator 502. As described above, this pulse causes the first S/H switch 504 to turn on for the specified duration so that the first sampling circuit 507 captures $V_{SNS1}$, which indicates the current through the first primary-side coil 116 at the end of the first phase 204.

Similarly, the second delay resistor 524 and second delay capacitor 526 (second RC circuit) together change the square wave G2' signal into a triangular signal. The second comparator 528 compares the triangularized G2' signal to $V_{REF}$. The second comparator 528 outputs a signal G2 that is a relatively high voltage (e.g., a logical one) while a voltage of the triangularized G2' signal is greater than $V_{REF}$, and a relatively low voltage (e.g., a logical zero) while a voltage of the triangularized G2' signal is less than $V_{REF}$. The high voltage G2 causes the second control switch 122 to turn on, and the low voltage G2 causes the second control switch 122 to turn off. This means that $V_{REF}$ acts as a second threshold voltage, and the push-pull converter 100 operates in the second phase 210 while the voltage of the triangularized G2' signal exceeds the second threshold voltage.

Also, G2 transitioning from the high voltage to the low voltage causes the second multistable multivibrator 508 to produce the pulse with the specified duration in an output signal G2F (F for falling edge) of the second multistable multivibrator 508. As described above, this causes the second S/H switch 510 to turn on for the specified duration so that the second sampling circuit 513 captures $V_{SNS2}$.

Figure 6:
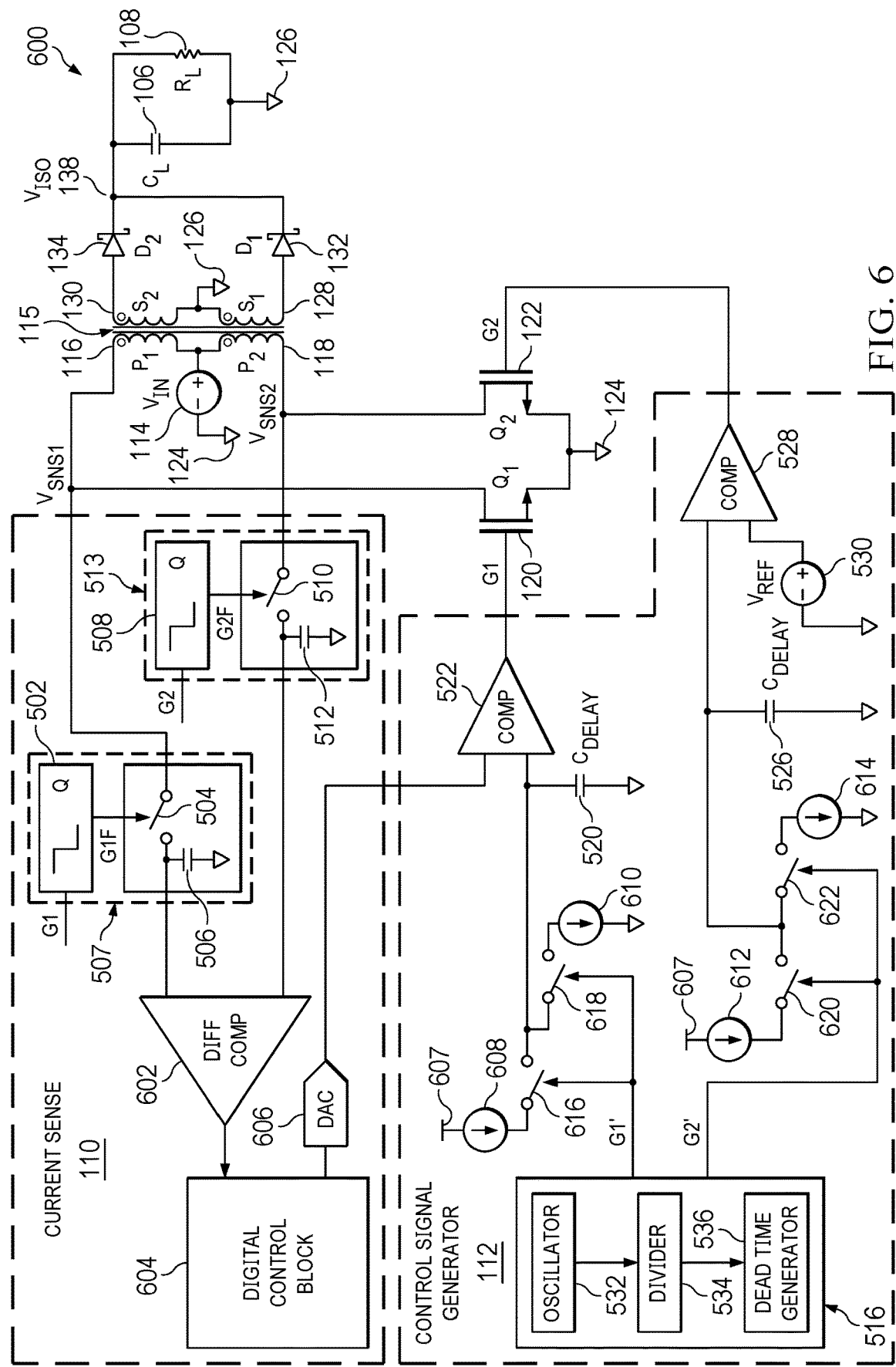
FIG. 6 is a circuit and functional block diagram of a push-pull converter of FIG. 1 with a second example implementation of the current sensor and control signal generator.

FIG. 6 is a circuit and functional block diagram of the push-pull converter 100 of FIG. 1 with a second example implementation of the current sensor 110 and control signal generator 112. The current sensor 110 includes the first and second monostable multivibrators 502 and 508, the first and second S/H switches 504 and 510, and the first and second S/H capacitors 506 and 512, as well as a differential comparator 602, a digital control block 604, and a digital-to-analog converter (DAC) 606. The control signal generator 112 includes the square wave generator 516, the first and second delay capacitors 520 and 526, the first and second comparators 522 and 528, and the voltage reference 530, as well as a control voltage source 607 that provides a control voltage, a first current source 608, a second current source 610, a third current source 612, a fourth current source 614, a first high-side switch 616, a first low-side switch 618, a second high-side switch 620, and a second low-side switch 622.

The second terminal of the first S/H switch 504 is connected to the first plate of the first S/H capacitor 506 and a first input of the differential comparator 602. The second terminal of the second S/H switch 510 is connected to the first plate of the second S/H capacitor 512 and a second input of the differential comparator 602. An output of the differential comparator 602 is connected to an input of the digital control block 604. An output of the digital control block 604 is connected to an input of the DAC 606. An output of the DAC 606 is connected to a second input of the comparator 522.

The first output of the square wave generator 516 provides G1' to a control input (e.g., a gate) of the first high-side switch 616 and to an inverted control input of the first low-side switch 618. A first terminal of the first current source 608 is connected to the control voltage source 607, and a second terminal of the first current source 608 is connected to a first terminal of the first high-side switch 616. A second terminal of the first high-side switch 616 is connected to a first terminal of the first low-side switch 618, a first plate of the first delay capacitor 520, and a first input of the first comparator 522. A second terminal of the first low-side switch 618 is connected to a first terminal of the second current source 610. A second terminal of the second current source 610 is connected to the primary-side ground 124.

The second output of the square wave generator 516 provides G2' to a control input of the second high-side switch 620 and to an inverted control input of the second low-side switch 622. A first terminal of the third current source 612 is connected to the control voltage source 607, and a second terminal of the third current source 612 is connected to a first terminal of the second high-side switch 620. A second terminal of the second high-side switch 620 is connected to a first terminal of the second low-side switch 622, a first plate of the second delay capacitor 526, and a first input of the second comparator 528. A second terminal of the second low-side switch 622 is connected to a first terminal of the fourth current source 614. A second terminal of the fourth current source 614 is connected to the primary-side ground 124.

The differential comparator 602 outputs a signal responsive to a difference between the current through the first primary-side coil 116 at the end of the most recent first phase 204 (indicated by $V_{SNS1}$) and the current through the second primary-side coil 118 at the end of the most recent second phase 210 (indicated by $V_{SNS2}$). In an example, the differential comparator 602 outputs a zero or a one, and the digital control block 604 samples the output of the differential comparator 602 and uses the samples to implement a digital filter. The output of the differential comparator 602 causes the digital control block 604 to increase or decrease a digital control value that corresponds to a threshold voltage to be provided to the second input of the second comparator 522.

For example, the digital control block 604 can store a value ranging from 0 to 31, which is adjusted in response to the output of the differential comparator 602. A clock signal used to control differential comparator 602 output sampling and updating of the value stored by the digital control block 604 may be derived from the output of the oscillator 532 or a clock used to generate the output of the oscillator 532, or from a different clock, such as a clock external to the push-pull converter 100. The value stored by the digital control block 604 is provided to the DAC 606, which provides a corresponding voltage to the second input of the first comparator 522 for use as the first threshold voltage. In an example, code zero (binary 00000) corresponds to zero milliVolts (mV), and code 31 (binary 11111) corresponds to 310 mV, with each code increment corresponding to a voltage increment of 10 mV.

In response to G1' having a high voltage, the first high-side switch 616 closes and the first low-side switch 618 opens, so that the first delay capacitor 520 is charged by the first current source 608. A delay can be added to the first high-side switch 616 closing to prevent shoot through. In response to G1' having a low voltage, the first high-side switch 616 opens and the first low-side switch 618 closes, so that the first delay capacitor 520 is discharged by the second current source 610. A delay can be added to the first low-side switch 618 closing to prevent shoot through. Accordingly, this switching behavior changes the square G1' waveform into a triangular waveform. The first comparator 522 compares a voltage of the triangularized G1' waveform to the first threshold voltage.

As discussed with respect to FIG. 5, while the voltage of the triangularized G1' waveform is greater than the first threshold voltage, the first comparator 522 outputs a signal to turn on the first control switch 120, operating the push-pull converter 100 in the first phase 204. When the voltage of the triangularized G1' waveform falls below the first threshold voltage, the first comparator 522 outputs a signal to turn off the first control switch 120, ending the first phase 204, and causing the first monostable multivibrator 502 to output the pulse of the specified duration so that the first sampling circuit 507 captures $V_{SNS1}$. By adjusting the first threshold voltage in response to a comparison by the differential comparator 602 between current through the first primary-side coil 116 (indicated by $V_{SNS1}$) and current through the second primary-side coil 118 (indicated by $V_{SNS2}$), the length of the first phase 204 is adjusted. This enables adjustment of the total current through the primary-side coil 116 during the first phase 204 to equal total current through the secondary-side coil 118 during the second phase 210 by adjusting the level of magnetizing current 218 that is reached during the first phase 204. Making these total currents equal reduces the possibility of flux walking and improves efficient operation of the push-pull converter 100, e.g., by reducing a peak current of the push-pull converter 100.

In response to G2' having a high voltage, the second high-side switch 620 closes and the second low-side switch 622 opens, so that the second delay capacitor 526 is charged by the third current source 612. A delay can be added to the second high-side switch 620 closing to prevent shoot through. In response to G2' having a low voltage, the second high-side switch 620 opens and the second low-side switch 622 closes, so that the second delay capacitor 526 is discharged by the fourth current source 614. A delay can be added to the second low-side switch 622 closing to prevent shoot through. Accordingly, this switching behavior changes the square G2' waveform into a triangular waveform. The second comparator 528 compares a voltage of the triangularized G2' waveform to the second threshold voltage ($V_{REF}$).

As discussed with respect to FIG. 5, while the voltage of the triangularized G2' waveform is greater than the second threshold voltage, the second comparator 526 outputs a signal to turn on the second control switch 122, operating the push-pull converter 100 in the second phase 210. When the voltage of the triangularized G2' waveform falls below the second threshold voltage, the second comparator 526 outputs a signal to turn off the second control switch 122, ending the second phase 210, and causing the second monostable multivibrator 508 to output the pulse of the specified duration so that the second sampling circuit 513 captures $V_{SNS2}$.

Figure 7:
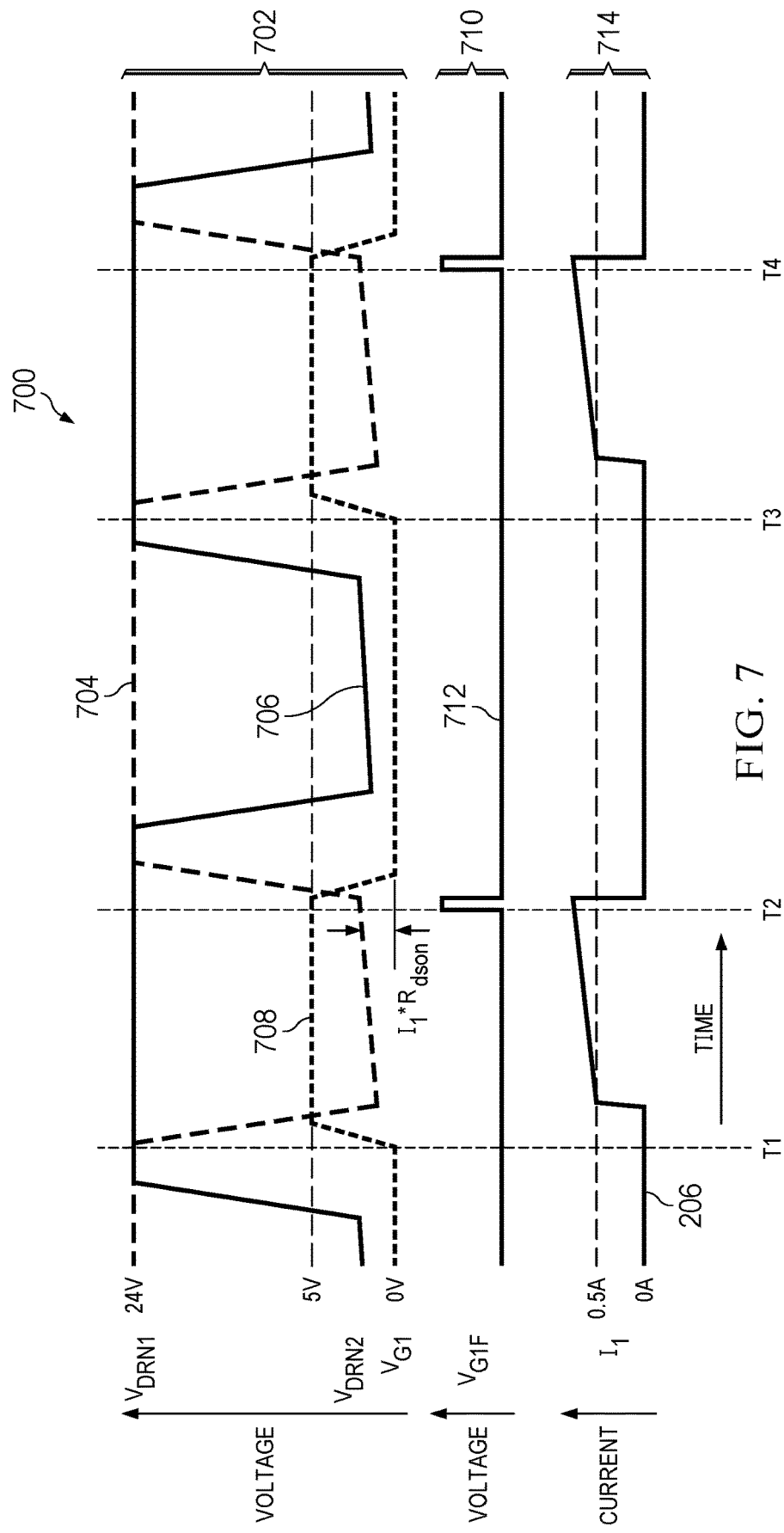
FIG. 7 is a set of graphs of example signals of the push-pull converter of FIG. 1.

FIG. 7 is a set of graphs 700 of example signals of the push-pull converter 100 of FIG. 1, including signals related to the current sensor 110 of FIG. 1. The horizontal axis of the set of graphs 700 represents time and the vertical axis of a first graph 702 represents voltage. The first graph 702 shows a first drain voltage ($V_{DRN1}$) 704 of the first control switch 120, a second drain voltage ($V_{DRN2}$) 706 of the second control switch 122, and a voltage of G1 ($V_{G1}$) 708 (the output of the first comparator 526). A second graph 710 shows a voltage of GIF 712 ($V_{G1F}$), which is the output of the first monostable multivibrator 502. The vertical axis of the second graph 710 represents voltage. A third graph 714 shows $I_1$ 206. The vertical axis of the third graph 714 represents current. In an example, the drain voltages of the first and second control switches 120 and 122 vary between 0 Volts (V) and 24 V. The voltage of G1 varies between 0 V and 5 V, and a current level of $I_1$ varies between 0 Amperes (A) and 5 A.

In this example, there is a first delay circuit (not shown) between the first comparator 122 and the first control switch 120, but not between the first comparator 122 and the first sampling circuit 507. Also, there is a second delay circuit (not shown) between the second comparator 128 and the second control switch 122, but not between the second comparator 128 and the second sampling circuit 513. In some examples, the first and second control switches 120 and 122 are power FETS, and the first and second delay circuits are (or include) gate drivers for the first and second control switches 120 and 122.

At T1 and T3, $V_{G1}$ 708 starts to increase, causing the first control switch 120 to start to turn on. After a brief delay, $V_{G1}$ 708 reaches a logical one state and the first control switch 120 fully turns on, so that $V_{DRN1}$ 708 goes low. The first control switch 120 turning on enables $I_1$ 206 to flow. $I_1$ 206 increases while the first control switch 120 is turned on because, as discussed above, the corresponding magnetizing current increases while the first control switch 120 is turned on.

At T2 and T4, $V_{G1F}$ 712 briefly goes high, followed shortly thereafter by $V_{G1}$ 708 starting to fall, causing the first control switch 120 to start to turn off. $V_{G1F}$ 712 going high causes the first sampling circuit 507 to capture the instantaneous value of $V_{DRN1}$ 708. The first control switch 120 turning off causes $V_{DRN1}$ 708 to go high. $V_{G1F}$ 712 going high precedes $V_{G1}$ 708 starting to fall because the first sampling circuit 507 receives an undelayed G1 signal, and the first control switch 120 receives a delayed G1 signal (the latter corresponding to $V_{G1}$ 708).

Figure 8:
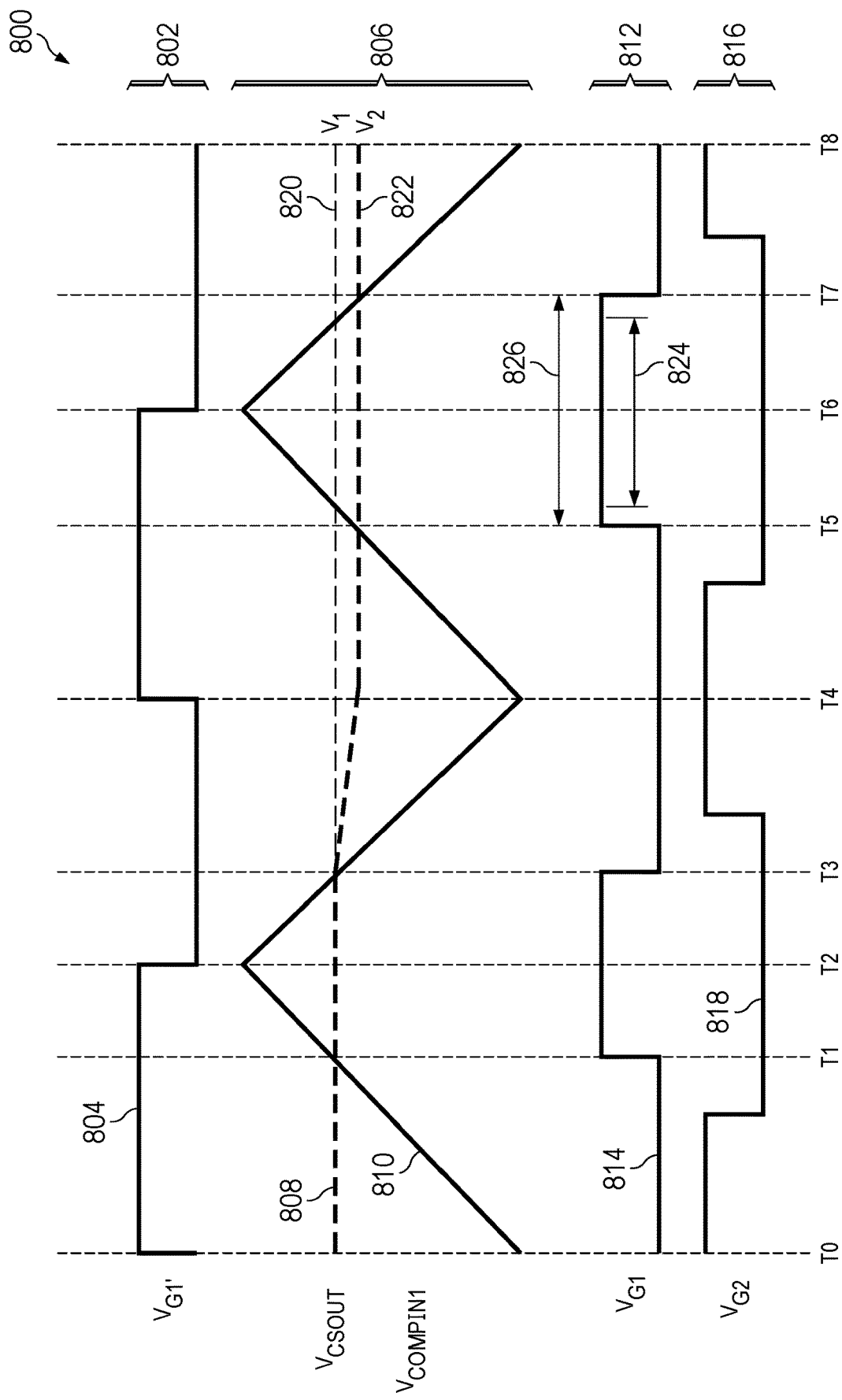
FIG. 8 is a set of graphs of signals of the push-pull converter of FIG. 1, including signals related to the control signal generator of FIG. 6.

FIG. 8 is a set of graphs 800 of signals of the push-pull converter 100 of FIG. 1, including signals related to the control signal generator 112 of FIG. 6. A first graph 802 shows a voltage of G1' ($V_{G1'}$) 804. A second graph 806 shows a voltage of the output ($V_{CSOUT}$) 808 of the current sensor 110 (such as the output of the op-amp 514 or of the DAC 606), and a voltage at the first input ($V_{COMPIN1}$) 810 of the first comparator 522 (such as a voltage as variously charged by the first current source 608 or discharged by the second current source 610). A third graph 812 shows a voltage at the output ($V_{G1}$) 814 of the first comparator 522. A fourth graph 816 shows a voltage at the output ($V_{G2}$) 818 of the second comparator 528.

As discussed with respect to, for example, FIG. 6, $V_{COMPIN1}$ 810 increases while $V_{G1'}$ 804 has the high voltage (from T0 to T2 and from T4 to T6), and decreases while $V_{G1'}$ 804 has the low voltage (from T2 to T4 and from T6 to T8). $V_{CSOUT}$ 808 is initially at a first voltage level ($V_1$) 820, and changes to a second voltage ($V_2$) 822 in response to a change in $V_{SNS1}$ (not shown), as captured by the first sampling circuit 507 when $V_{G1}$ goes low at T3. In an example, $V_2$ 822 is less than $V_1$ 820. The illustrated change in $V_{SNS1}$ is with respect to a $V_{SNS1}$ captured during the previous cycle of operation of the push-pull converter 100.

The first comparator 522 compares $V_{COMPIN1}$ 810 to $V_{CSOUT}$ 808, and outputs $V_{G1}$ 814 with the high voltage while $V_{COMPIN1}$ 810 is greater than $V_{CSOUT}$ 808. $V_1$ 820 acts as a first threshold voltage for $V_{COMPIN1}$ 810, and $V_2$ 822 acts as a second threshold voltage for $V_{COMPIN1}$ 810. If $V_{CSOUT}$ 808 equals $V_1$ 820, then the first phase 204 has a first duration 824. Accordingly, if $V_{CSOUT}$ 808 equals $V_1$ 820, $V_{G1}$ 814 has the high voltage (from T1 to T3) for the first duration, which turns on the first control switch 120 for the first duration. If $V_{CSOUT}$ 808 equals $V_2$ 822, then the first phase 204 has a second duration 826. Because $V_2$ 822 is less than $V_1$ 820, the second duration 826 is longer than the first duration 824. Also, because the triangular waveform of $V_{COMPIN1}$ 810 is symmetric about the time when $V_{G1'}$ 804 goes low, the change in duration of the first phase 204 from the first duration 824 to the second duration 826 symmetrically reduces a duration of the first dead time 208 and a duration of the second dead time 214. Accordingly, the second duration 826 starts an equal amount of time prior to when the first duration 824 would start, to an amount of time the second duration 826 ends after the first duration 824 would end.

Figure 9:
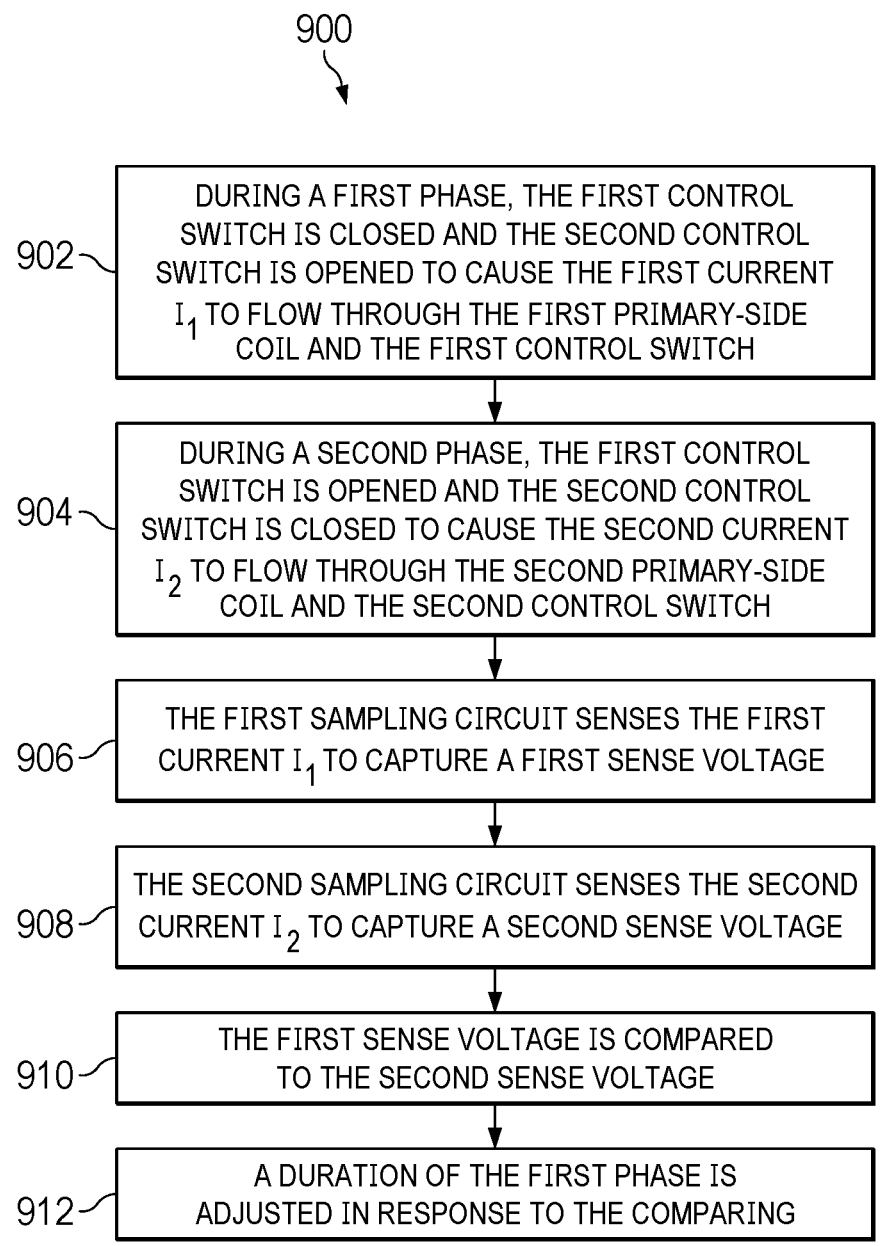
FIG. 9 is a diagram of an example process for operating a push-pull converter such as the push-pull converter of FIG. 5 or the push-pull converter of FIG. 6.

FIG. 9 is a diagram of an example process 900 for operating a push-pull converter such as the push-pull converter 500 of FIG. 5 or the push-pull converter 600 of FIG. 6. In step 902, during a first phase, the first control switch 120 is closed and the second control switch 122 is opened to cause the first current $I_1$ 206 to flow through the first primary-side coil 116 and the first control switch 120. In step 904, during a second phase, the first control switch 120 is opened and the second control switch 122 is closed to cause the second current $I_2$ 212 to flow through the second primary-side coil 118 and the second control switch 122. In step 906, the first sampling circuit 507 senses the first current $I_1$ 206 to capture a first sense voltage. In step 908, the second sampling circuit 513 senses the second current $I_2$ 212 to capture a second sense voltage. In step 910, the first sense voltage is compared to the second sense voltage. In step 912, a duration of the first phase is adjusted in response to the comparing.

Modifications are possible in the described examples, and other examples are possible, within the scope of the claims.

In some examples, transistors other than MOSFETS are used.

In some examples, switches other than transistors are used.

In some examples, capacitive elements other than polarized capacitors are used.

In some examples, resistive elements other than resistors are used.

In some examples, a relatively low reference voltage is used as the primary-side ground 124 or the secondary-side ground 126.

In some examples, a different sampling time is used for sampling drain voltages of the first and second control switches 120 and 122, such as beginnings or midpoints of the first phase 204 and the second phase 210.

In some examples, voltages at high-side terminals of the first control switch 120 and the second control switch 122 are sampled.

In some examples, the first and second primary-side coils 116 and 118 are wound in a bifilar way around the magnetic core 115. In some examples, the first and second secondary coils 128 and 130 are wound in a bifilar way around the magnetic core 115.

In some examples, the magnetic core 115 is toroidal.

In some examples, the current sensor 110 and control signal generator 112 can be used to prevent saturation in transformers used in converters other than push-pull converters.

In some examples, the current sensor 110 and control signal generator 112 can be used to prevent saturation in transformers other than transformers with a center-tapped secondary winding.

In some examples, the current sensor 110 and control signal generator 112 are used with power converters other than push-pull converters.

In some examples, the square wave generator 516, with the first and second delay resistors 518 and 524, can be modeled as current sources for selectably charging or allowing discharge of the first and second delay capacitors 520 and 526, respectively.

In some examples, the square wave generator 516, with the control voltage source 607, the first, second, third, and fourth current sources 608, 610, 612, and 614, the first and high-side switches 616 and 620, and the first and second low-side switches 618 and 622, can be modeled as current sources for selectably charging or discharging the first and second delay capacitors 520 and 526, respectively.

In some examples, a second output of the op-amp 514 is connected to the second input of the second comparator 528 (e.g., instead of the voltage reference 530). The first output of the op-amp 514 causes a corresponding threshold voltage of the first comparator 522 to change, so that a turn on duration of the first control switch 120 is lengthened or shortened. Also, the second output of the op-amp 514 causes a corresponding threshold voltage of the second comparator 528 to change, so that a turn on duration of the second control switch 122 is changed in an opposite direction. Accordingly, the first control switch 120 turn on duration is lengthened and the second control switch 122 turn duration is shortened, or the first control switch 120 turn on duration is shortened and the second control switch 122 turn duration is lengthened. In some examples, the amount by which one duration is lengthened equals the amount by which the other duration is shortened. In some examples, the amount by which one duration is lengthened is different from the amount by which the other duration is shortened.

In some examples, a second output of the digital control block 604 is connected to a second input of the DAC 606, which provides a corresponding second output to the second input of the second comparator 528 (e.g., instead of the voltage reference 530). The resulting DAC 606 output signals are, for example, complimentary control signals or differential control signals.

In some examples, the digital control block 604 provides a single output to the DAC 606, and the DAC 606 generates corresponding complimentary or differential control signals. The first output of the DAC 606 causes a corresponding threshold voltage of the first comparator 522 to change, so that a turn on duration of the first control switch 120 is lengthened or shortened. Also, the second output of the DAC 606 causes a corresponding threshold voltage of the second comparator 528 to change, so that a turn on duration of the second control switch 122 is changed in an opposite direction. Accordingly, the first control switch 120 turn on duration is lengthened and the second control switch 122 turn duration is shortened, or the first control switch 120 turn on duration is shortened and the second control switch 122 turn duration is lengthened.

In some examples, the amount by which one duration is lengthened is different from the amount by which the other duration is shortened. In an example, a control code ranges from 0 to 31, and a corresponding DAC 606 output voltage ranges from zero mV to 310 mV. In an example single-input differential DAC 606, code zero (binary 00000) corresponds to a first DAC 606 output of zero mV and a second DAC 606 output of 310 mV; and code 31 (binary 11111) corresponds to a first DAC 606 output of 310 mV and a second DAC 606 output of zero mV. Each code increment increases the first DAC 606 output by 10 mV and decreases the second DAC 606 output by 10 mV (the same voltage).

In some examples, an integrated circuit (IC) or package includes the current sensor 110 and the control signal generator 112. In some examples, the IC or package also includes gate drivers for the first and second control switches 120 and 122. In some examples, the IC or package also includes the first and second control switches 120 and 122.

In some examples, a secondary-side coil is not center-tapped and/or does not have a centered ground.

In some examples, a push-pull converter is included in a traction inverter or in an on-board charger.

What is claimed is:

1. A converter circuit comprising:
   a current sensor including a first input, a second input, and an output;
   first and second capacitors, each respectively including a first terminal and a second terminal;
   a first current source coupled to the first terminal of the first capacitor;
   a second current source coupled to the first terminal of the second capacitor;
   a first comparator including a first input, a second input, and an output, the first input of the first comparator coupled to the first terminal of the first capacitor, and the second input of the first comparator coupled to the output of the current sensor;
   a second comparator including a first input, a second input, and an output, the first input of the second comparator coupled to the first terminal of the second capacitor; and
   a first control switch and a second control switch, each respectively including a first terminal, a second terminal, and a control terminal, the first terminal of the first control switch coupled to the first input of the current sensor, the first terminal of the second control switch coupled to the second input of the current sensor, the control terminal of the first control switch coupled to the output of the first comparator, and the control terminal of the second control switch coupled to the output of the second comparator.

2. The converter circuit of claim 1, wherein the current sensor is configured to provide an output in response to a comparison between its first and second inputs.

3. The converter circuit of claim 1, wherein the current sensor includes:
   a first sampling circuit including an input, an output, and a control terminal, the input of the first sampling circuit coupled to the first input of the current sensor, and the control terminal of the first sampling circuit coupled to the control terminal of the first control switch;
   a second sampling circuit including an input, an output, and a control terminal, the input of the second sampling circuit coupled to the second input of the current sensor, and the control terminal of the second sampling circuit coupled to the control terminal of the second control switch; and
   an operational amplifier (op-amp) including a first input, a second input, and an output, the first input of the op-amp coupled to the output of the first sampling circuit, the second input of the op-amp coupled to the output of the second sampling circuit, and the output of the op-amp coupled to the output of the current sensor.

4. The converter circuit of claim 1, wherein the current sensor includes:
   a first sampling circuit including an input, an output, and a control terminal, the input of the first sampling circuit coupled to the first input of the current sensor, and the control terminal of the first sampling circuit coupled to the control terminal of the first control switch;
   a second sampling circuit including an input, an output, and a control terminal, the input of the second sampling circuit coupled to the second input of the current sensor, and the control terminal of the second sampling circuit coupled to the control terminal of the second control switch;
   a digital control block that increases or decreases a value of a digital control signal in response to a comparison between the output of the first sampling circuit and an output of the second sampling circuit; and
   a digital-to-analog converter that provides an output to the output of the current sensor in response to the digital control signal.

5. The converter circuit of claim 1, further including a transformer that includes a center-tapped primary-side coil having a first terminal and a second terminal, the first terminal of the center-tapped primary-side coil coupled to the first terminal of the first control switch and the first input of the current sensor, and the second terminal of the center-tapped primary-side coil coupled to the first terminal of the second control switch and the second input of the current sensor.

6. The converter circuit of claim 5, further including:
   a first diode and a second diode each respectively including an anode and a cathode;
   a third capacitor including a first terminal and a second terminal; and
   a first secondary-side coil and a second secondary-side coil, the first and second secondary-side coils each respectively including a first terminal and a second terminal, the first terminal of the first secondary-side coil coupled to the anode of the first diode, the first terminal of the second secondary-side coil coupled to the anode of the second diode, and the first terminal of the third capacitor coupled to the cathode of the first diode and the cathode of the second diode.

7. The converter circuit of claim 1,
wherein the output of the current sensor is a first output of the current sensor, and the current sensor includes a second output; and
wherein the second input of the second comparator is coupled to the second output of the current sensor.

8. The push-pull converter of claim 1, wherein the push-pull converter is included in a traction inverter or in an on-board charger.

9. A converter circuit comprising:
a current sensor including a first input, a second input, and an output;
a control signal generator including an input, a first output, and a second output, the input of the control signal generator coupled to the output of the current sensor; and
a first control switch and a second control switch, each respectively including a first terminal, a second terminal, and a control terminal, the first terminal of the first control switch coupled to the first input of the current sensor, the first terminal of the second control switch coupled to the second input of the current sensor, the control terminal of the first control switch coupled to the first output of the control signal generator, and the control terminal of the second control switch coupled to the second output of the control signal generator;
wherein the control signal generator is configured to:
control the first control switch to be closed and the second control switch to be open in a first phase;
control the first control switch to be open and the second control switch to be closed in a second phase that alternates with the first phase; and
adjust a duration of the first phase in response to the output of the current sensor, without changing a duration of a period of the converter;
wherein the current sensor includes:
a first sampling circuit including an input, an output, and a control terminal, the input of the first sampling circuit coupled to the first input of the current sensor, and the control terminal of the first sampling circuit coupled to the control terminal of the first control switch;
a second sampling circuit including an input, an output, and a control terminal, the input of the second sampling circuit coupled to the second input of the current sensor, and the control terminal of the second sampling circuit coupled to the control terminal of the second control switch; and
an operational amplifier (op-amp) including a first input, a second input, and an output, the first input of the op-amp coupled to the output of the first sampling circuit, the second input of the op-amp coupled to the output of the second sampling circuit, and the output of the op-amp coupled to the output of the current sensor.

10. The push-pull converter of claim 9, wherein the current sensor is configured to provide an output in response to a comparison between its first and second inputs.

11. The push-pull converter of claim 9, wherein the current sensor includes:
a first sampling circuit including an input, an output, and a control terminal, the input of the first sampling circuit coupled to the first input of the current sensor, and the control terminal of the first sampling circuit coupled to the control terminal of the first control switch;
a second sampling circuit including an input, an output, and a control terminal, the input of the second sampling circuit coupled to the second input of the current sensor, and the control terminal of the second sampling circuit coupled to the control terminal of the second control switch;
a digital control block that increases or decreases a value of a digital control signal in response to a comparison between the output of the first sampling circuit and an output of the second sampling circuit; and
a digital-to-analog converter that provides an output to the output of the current sensor in response to the digital control signal.

12. The converter circuit of claim 9, further including a transformer that includes a center-tapped primary-side coil having a first terminal and a second terminal, the first terminal of the center-tapped primary-side coil coupled to the first terminal of the first control switch and the first input of the current sensor, and the second terminal of the center-tapped primary-side coil coupled to the first terminal of the second control switch and the second input of the current sensor.

13. The converter circuit of claim 12, further including:
a first diode and a second diode each respectively including an anode and a cathode;
a third capacitor including a first terminal and a second terminal; and
a first secondary-side coil and a second secondary-side coil, the first and second secondary-side coils each respectively including a first terminal and a second terminal, the first terminal of the first secondary-side coil coupled to the anode of the first diode, the first terminal of the second secondary-side coil coupled to the anode of the second diode, and the first terminal of the third capacitor coupled to the cathode of the first diode and the cathode of the second diode.

14. The converter circuit of claim 9, wherein the control signal generator is configured to control the first control switch in response to a comparison between a current at the first terminal of the first control switch and a signal generated by the control signal generator.

15. The converter circuit of claim 9,
wherein the output of the current sensor is a first output of the current sensor, and the current sensor includes a second output; and
wherein the control signal generator is configured to adjust a duration of the second phase in response to the output of the current sensor, without changing a duration of a period of the converter, and so that the adjusting of the duration of the second phase is in a longer/shorter direction opposite to a longer/shorter direction of the adjusting of the first phase.

* * * * *